C. W. WELLS.
STOVE OR FURNACE.
APPLICATION FILED AUG. 27, 1908.

908,366.

Patented Dec. 29, 1908.

2 SHEETS—SHEET 1.

Witnesses
Hugh H. Ott
C. C. Hines

Inventor
Clarence W. Wells
By Victor J. Evans
Attorney

C. W. WELLS.
STOVE OR FURNACE.
APPLICATION FILED AUG. 27, 1908.
908,366.
Patented Dec. 29, 1908.
2 SHEETS—SHEET 2.
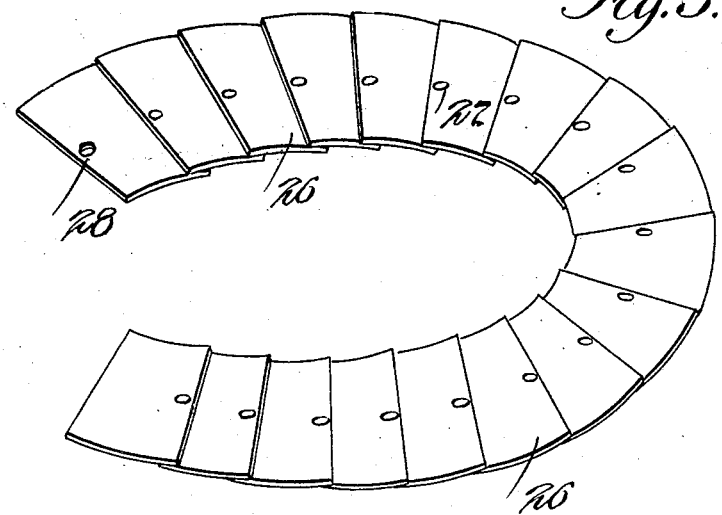
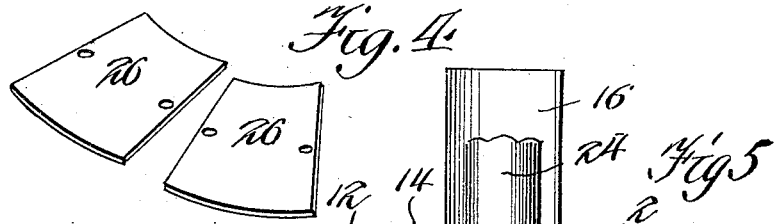
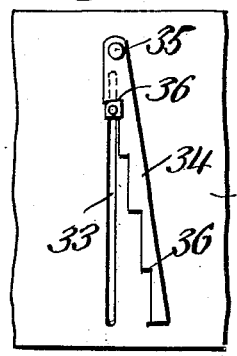
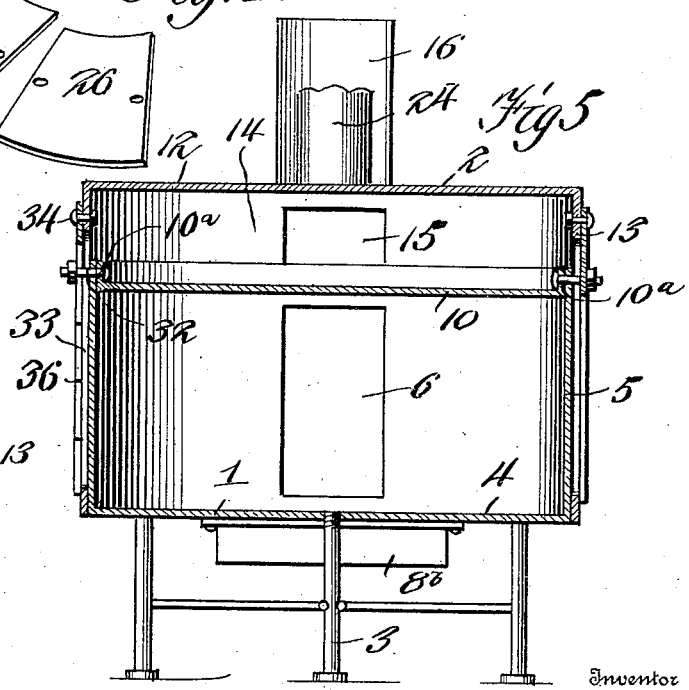

UNITED STATES PATENT OFFICE.

CLARENCE W. WELLS, OF REEPSVILLE, NORTH CAROLINA.

STOVE OR FURNACE.

No. 908,366.  Specification of Letters Patent.  Patented Dec. 29, 1908.

Application filed August 27, 1908. Serial No. 450,491.

*To all whom it may concern:*

Be it known that I, CLARENCE W. WELLS, a citizen of the United States, residing at Reepsville, in the county of Lincoln and State of North Carolina, have invented new and useful Improvements in Stoves or Furnaces, of which the following is a specification.

This invention relates to improvements in stoves or furnaces especially designed for the purpose of heating water or warming and cooking food for stock or cooking and canning fruits, etc., the object of the invention being to provide a heater of this character which is simple of construction, efficient in use and inexpensive of production, which is adapted for the reception of heating and cooking vessels of different sizes, and which is constructed to secure an effective circulation of the heat about the vessel so as to utilize all of the available heat units of the fuel.

The invention consists of the features of construction, combination and arrangement of parts hereinafter fully described and claimed, reference being had to the accompanying drawings, in which:—

Figure 1:
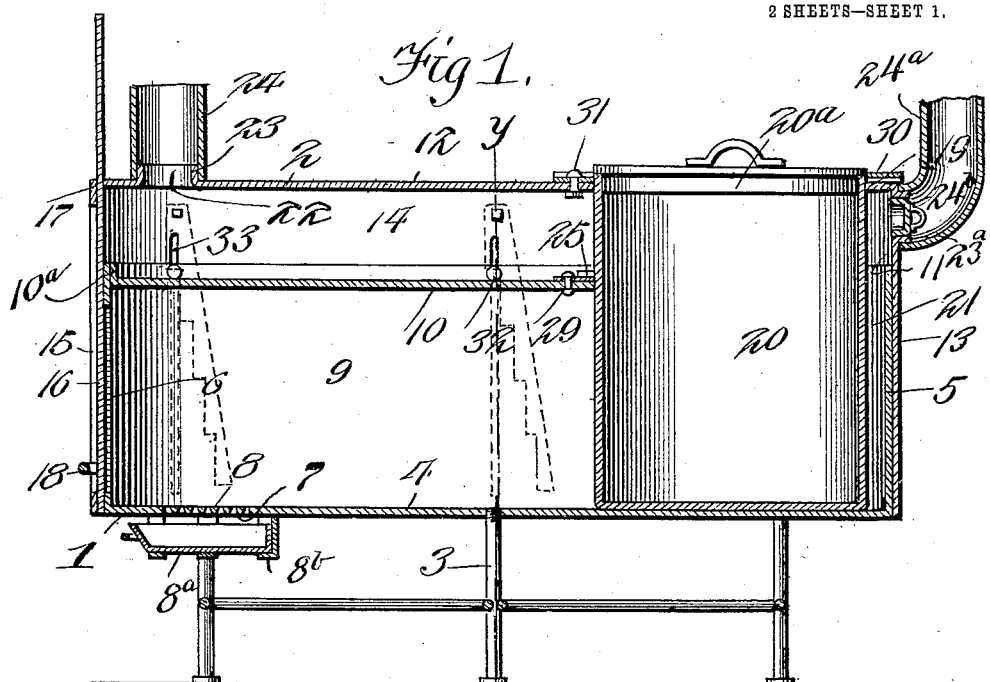
Figure 2:
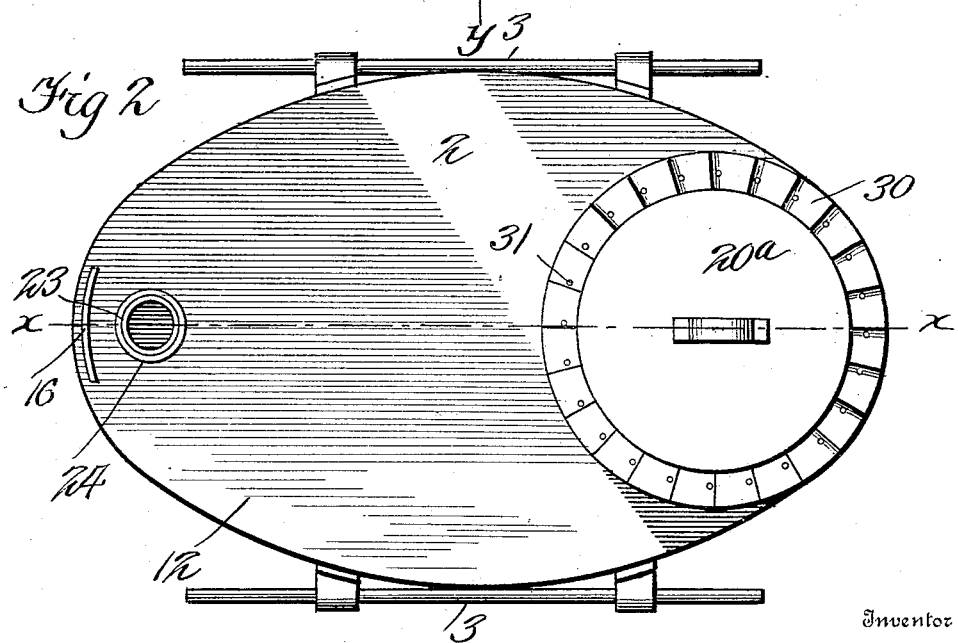

Figure 1 is a vertical longitudinal section on the line x—x of Fig. 2 of a stove or furnace embodying my invention. Fig. 2 is a top plan view of the same. Fig. 3 is a perspective view of one of the adjustable closure collars. Fig. 4 is a detail view of two of the link plates thereof. Fig. 5 is a vertical transverse section through the stove on the line y—y of Fig. 1. Fig. 6 is a detail fragmentary side elevation, showing one of the pivoted slot-closure strips.

In practice, the body of the stove is preferably made of oval or oblong rectangular form, or of any equivalent form, and constructed of sheet metal or other suitable material. It comprises a base section 1 and an adjustable top section 2. The base section 1 is supported upon a suitable base or stand 3, which may be of any preferred construction and is designed to hold the stove at a suitable elevation above the surface of the floor or ground. The base section 1 consists of a bottom 4 and a side wall 5 rising therefrom, which latter may be of any desired height and is provided at one end with a doorway or opening 6. In the bottom wall 4 of said base section is formed an opening 7 in which is arranged a suitable grate 8, consisting of a series of bars of ordinary construction spaced apart to provide for the upward circulation of air into the fire box or combustion chamber 9. Below this grate may be arranged an ash-pan $8^a$ to receive the coals and ashes dropping therethrough, which pan is adapted to be slid into and out of a suitable holder $8^b$ on the base or stand 3. A horizontal partition 10 is secured to the side walls and the end wall in which the doorway 6 is formed, and extends from the latter toward the opposite end wall a distance equivalent to about two thirds the length of the base section, the inner end of said partition being segmentally curved, so that an opening 11 is left in the top of the base section between the said inner end of the partition and the adjacent end of said section, or that end opposite to the end in which the doorway 6 is formed.

The top section 2 comprises a top wall 12 having a depending side wall 13 of greater depth than the side wall 5 of the base section, so that when said top section, which is removable from the base section, is fully fitted down upon the same, as shown in Fig. 1, the lower edge of the wall 13 will terminate in line with the bottom 4, while the upper portion of the wall 13 and the top wall 12 will lie above the upper edge of the wall 5 and form a flue or passage 14 communicating with the rear end of the fire box 9 through the opening 11. The top section is telescopically mounted for sliding adjustment on the base section so that the height of the body of the stove may be increased or diminished for the reception of heating or cooking vessels of different heights, and, as shown, the wall 13 of the top section is provided with a doorway or opening 15 adapted to register to a greater or less extent with the doorway or opening 6. A sliding door 16 is mounted for vertical movement between the side walls of the two sections and through a guide slot 17 in the wall 12 and is adapted to be adjusted through the medium of a handle 18 to control the openings 6 and 15, for the insertion of the fuel into the fire box, the removal of the ashes therefrom, and to regulate the draft of the stove, as will be readily understood.

Formed in the top wall of the top section is a circular receiving opening 19 which is arranged above the opening 11 in the bottom section, which latter opening 11, owing to the elliptical form of the stove body, varies from a true circular form, so that upon the insertion of a cylindrical heating or cooking vessel, as 20, down through said opening into the fire box of the stove, a surrounding channel 21 will be left for the passage of the smoke and products of combustion from the fire box around the lower portion of the vessel and thence upward through the opening 11 into the superposed portion of the flue 14, whence said smoke and products of combustion pass around the top portion of the vessel and flow toward the opposite end of the flue, where they discharge through an outlet opening 22. From the wall 12 about the opening rises a flange 23 about which may be fitted the lower end of a smoke pipe 24 of proper length to secure the desired strength of draft. The upper end of the vessel is designed to extend through the opening 19 and is closed by a suitable cover 20$^a$, the lower end of the vessel resting against the bottom 4 of the base section, whereby said vessel, in which the water to be heated or food or fruit to be cooked is placed, is supported during the heating or cooking operation. At the end of the top section opposite the outlet 23, said top section is provided with an outlet 23$^a$, which outlet is flanged to receive a smoke pipe 24$^a$ and is adapted to be closed by a closure 24$^b$, which is also adapted to be used for closing the outlet 23.

Fig. 1 shows the top section as adjusted to adapt the stove to receive a vessel of minimum height and maximum diameter, from which it will be apparent that the vessel snugly fits within and closes the opening 19 and also bears closely against the inner segmental end of the partition 10. To adapt the stove for the reception of vessels of the same diameter but of a greater height, the top section is adjusted upwardly on the bottom section to an extent corresponding to the height of the particular vessel, so that the vessel will be mainly inclosed and subjected to all the available heat of the fire. In order to provide for the reception of different sizes of vessels of a smaller diameter and to prevent the escape of the smoke and products of combustion through the opening 19 and through the space between the vessel and the inner end of the partition 10, flexible closure strips or collars which are adjustable to accord with the size of the vessel are employed. The general construction of each of these closure strips or collars is illustrated in Figs. 3 and 4. The collar 25 for closing the space between the vessel and inner end of the partition 10 is of proper length to surround that portion of the vessel disposed opposite said partition and comprises a series of tapered link plates 26, pivotally connected at their adjacent longitudinal edges by pins or rivets 27, one of the end links of said collar being formed with an opening 28 for the passage of a rivet 29 to secure it to the partition 10, while the other end of said collar is free from connection with the partition or strip, so that by the pivotal motion of the links on each other the collar may be extended and contracted or adjusted to suit the size of the vessel and the width of the space between the same and the partition, so that such space may be closed against the upward passage of the smoke and products of combustion therethrough, thereby compelling the same to take the ordinary course of circulation before described. The collar 30 for closing the space between the edge of the opening 19 and the body of the vessel, when vessels of smaller diameter than said opening are applied for use, is secured at one end to the wall 12 by a fastening pin or rivet 31, its opposite end being free so that it may be adjusted around the vessel to close the surrounding space or opening against the discharge of the smoke and products of combustion. In this manner the stove may be adjusted to receive vessels varying in size and capacity without liability of the escape of any portion of the available heat from the fire.

The top section may have sufficient frictional engagement with the base section to hold it in adjusted position, but if desired fastening means for this purpose may be employed. In the present instance bolts or screws 32 are shown passing through the side wall of the base section and through vertical slots 33 in the depending wall of the top section, thus allowing the latter to be vertically adjusted, guided in its movements and secured to the desired degree against movement in adjusted position. These bolts or screws also preferably pass through and engage a flange 10$^a$ on the partition 10 and detachably secure the same in position. In order to close the slots 33 against the escape of the smoke and products of combustion therethrough when the top section is elevated to any considerable extent, cover strips 34 are employed. Each of these strips is pivotally mounted above the top of the adjacent slot 33 upon a pivot pin or bolt 35, and one of the vertical longitudinal side edges of said strip is stepped or notched to form a series of supporting shoulders 36 to engage and rest upon the adjacent bolt 32 to support the top section at different elevations and to close all of that portion of the slot 33 projecting above the upper edge of the bottom section. It will be seen that the bolts 32 not only slidably connect the top section with the bottom section and detachably fasten the partition 10 in position, but also form supports with which the shouldered strips may be engaged to hold the top section at any desired position of adjustment.

Instead of having the smoke and products of combustion circulate in the manner described around the base of the vessel 20, thence upwardly through the space 21 around the top of the vessel and out through the flue 14 and pipe 24, the partition may be removed and the closure 24 employed to stop the outlet 23, whereupon the smoke and products of combustion from the fuel within the fire box or combustion chamber will circulate rearwardly, and in connection with the flames from the fire, play against and pass around the vessel 20 and then discharge through the outlet 23$^a$. This arrangement of the parts will be found desirable under some conditions of service.

From the foregoing description, the construction and mode of operation of my improved stove or furnace will be readily understood, and it will be seen that the invention provides a device of this character which is adapted for the reception of different sizes of vessels to allow either small or large amounts of water to be heated or food or fruit cooked, and that the construction described also provides for the heating of the vessel in a superior manner to secure the full effect of the heat of the flames and products of combustion thereon. The stove or furnace may also be employed for cooking and canning fruits, or for evaporating fruits by the dry air or steam heating process and for many other useful purposes.

Having thus fully described the invention what is claimed as new is:

1. A heating device of the class described comprising a base section, a top section telescopically connected therewith, said top section being provided with a receiving opening and a smoke outlet, a partition within the base section terminating near one end thereof to form a receiving opening below the receiving opening in the top section and also forming a flue or passage between said receiving opening in the lower section and said smoke outlet, a vessel adapted to be inserted through said receiving openings into the base and top sections, whereby the portion of the base section below the partition and between said vessel and the opposite end of said base section is adapted to form a fire box, and a draft door upon the base section controlling the inlet of air to said fire box.

2. A heating device of the class described comprising a base section, a top section telescopically connected therewith, said top section being provided with a receiving opening and a smoke outlet, a partition within the base section terminating near one end thereof to form a receiving opening below the receiving opening in the top section and also forming a flue or passage between said receiving opening in the lower section and said smoke outlet, a vessel adapted to be inserted through said receiving openings into the base and top sections, whereby the portion of the base section below the partition between said vessel and the opposite end of said base section is adapted to form a fire box, flexible closure strips for varying the size of said receiving openings, and a draft door upon the base section controlling the inlet of air to said fire box.

3. A heating device comprising a bottom section provided with a fire box, a top section telescopically engaging said bottom section and provided with an opening for the insertion of a heating or cooking vessel, and also having an outlet for the products of combustion, and means for securing said top section at different elevations upon said bottom section.

4. A heater of the character described, comprising a bottom section having a combustion chamber, a top section telescopically connected therewith, said top section being provided with an opening for the insertion of a heating or cooking vessel and having an outlet and vertical slots, securing bolts upon the bottom section passing through said slots, and closure strips upon the top section movable into position to close said slots and adapted to interlock with said bolts to hold said top section elevated.

5. A heating device of the character described, comprising a bottom section provided with a combustion chamber, a top section telescopically connected therewith and having an outlet for the products of combustion and an opening for the insertion of a cooking or heating vessel and also provided with vertical slots, securing bolts upon the bottom section projecting through said slots, and pivoted closure strips for the slots upon the top section provided with locking shoulders to engage the aforesaid bolts to hold said top section in adjusted position.

6. A heater of the character described, comprising a bottom section having a combustion chamber, a top section telescopically connected therewith for vertical adjustment and provided with an outlet for the products of combustion and an opening for the insertion of a heating or cooking vessel, and a partition within said bottom section extending above the combustion chamber and closing communication between the same and the superposed portion of the top section, thus forming an intervening flue for the discharge of the products of combustion through said outlet, said flue being in communication with the rear end of the combustion chamber through passages around the inserted vessel.

7. A heater of the character described, comprising a bottom section having a combustion chamber, a horizontal partition above said combustion chamber partially closing the top of said bottom section, a top section telescopically engaging and adjustable on said bottom section and provided with an outlet for the products of combustion in a plane above said partition and having an opening above the open portion of the bottom section for the insertion of a heating or cooking vessel, said partition forming a flue leading from said outlet to the combustion chamber through a passage in the bottom section around the inserted vessel, bolts detachably securing said partition in position and projecting laterally from the bottom section, and closure strips upon the top section movable to close portions of the slots therein above said bottom section and adapted to interlock with said bolts to hold said top section elevated.

8. A heater of the character described, comprising a bottom section having an opening at the front end thereof and provided with a horizontal partition in its upper portion terminating short of the opposite end thereof, the space below said partition forming a combustion chamber with which said opening communicates, a top section telescopically adjustable on said bottom section and having an outlet for the products of combustion and an opening for the insertion of a heating or cooking vessel down into said bottom section between said partition and the opposite end of said bottom section, said vessel adapted when inserted to leave a space for the discharge of the products of combustion about the same from said combustion chamber into said top section, the said partition forming a flue between the same and the top section and leading from said space to said outlet, said top section also being provided in its front with an opening, and a door slidable between said sections for closing the openings in the front ends thereof.

In testimony whereof I affix my signature in presence of two witnesses.

CLARENCE W. WELLS.

Witnesses:
E. P. JOHNSON,
J. Z. SAIN.